(12) United States Patent
Maejima

(10) Patent No.: US 6,789,207 B1
(45) Date of Patent: Sep. 7, 2004

(54) MICROPROCESSOR

(75) Inventor: Hideo Maejima, Hitachi (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/719,835
(22) PCT Filed: Jul. 2, 1998
(86) PCT No.: PCT/JP98/02985
§ 371 (c)(1), (2), (4) Date: Dec. 18, 2000
(87) PCT Pub. No.: WO00/02118
PCT Pub. Date: Jan. 13, 2000

(51) Int. Cl.[7] .............................................. G06F 1/32
(52) U.S. Cl. ........................ 713/322; 713/300; 713/320
(58) Field of Search ............................... 713/300, 322; 307/32; 327/295

(56) References Cited

U.S. PATENT DOCUMENTS

| | | | | |
|---|---|---|---|---|
| 4,935,642 A | * | 6/1990 | Obelode et al. | 307/32 |
| 6,223,080 B1 | * | 4/2001 | Thompson | 607/16 |
| 6,477,654 B1 | * | 11/2002 | Dean et al. | 713/300 |
| 6,600,575 B1 | * | 7/2003 | Kohara | 358/406 |

FOREIGN PATENT DOCUMENTS

| | | |
|---|---|---|
| JP | 5-11897 | 1/1993 |
| JP | 7-20968 | 1/1995 |
| JP | 7-295695 | 11/1995 |
| JP | 8-152945 | 6/1996 |
| JP | 8-272579 | 10/1996 |
| JP | 9-251334 | 9/1997 |
| JP | 10-198455 | 7/1998 |

* cited by examiner

Primary Examiner—Thomas Lee
Assistant Examiner—P Chandrasekhar
(74) Attorney, Agent, or Firm—Mattingly, Stanger & Malur, P.C.

(57) ABSTRACT

For the tradeoffs between a lower consumption power of a microprocessor and its process speed, a plurality of clocks and power supply voltages are supplied to each of functional units 104 to 107 and a clock switching circuit and a power switching circuit are provided in each of the functional units. When a program mainly using a particular functional unit, e.g., FPU 106, is executed, the operation speed of FPU 106 is raised more than that in a normal operation mode. To this end, a consumption power control circuit 102 supplies a power/clock switching signal 113c to FPU 106. This power/clock switching signal 113c instructs to raise the clock frequency and power supply voltage to be used by FPU 106. In order to compensate for an increase in the consumption power to be caused by the high speed operation of FPU 106, the consumption power control circuit 102 also supplies a power/clock signal 113b to another functional unit, e.g., CPU 105. This power/clock switching signal 113c instructs to lower the clock frequency of CPU 105.

2 Claims, 7 Drawing Sheets

600

| 112 | | 113a | | | 113b | | | 113c | | | 113d | | |
|---|---|---|---|---|---|---|---|---|---|---|---|---|---|
| d1 | d0 | p | c1 | c0 | p | c1 | c0 | p | c1 | c0 | p | c1 | c0 |
| 0 | 0 | 0 | 0 | 0 | 0 | 0 | 0 | 0 | 0 | 0 | 0 | 0 | 0 |
| 0 | 1 | 1 | 1 | 0 | 0 | 0 | 1 | 1 | 1 | 0 | 0 | 0 | 1 |
| 1 | 0 | 1 | 1 | 0 | 1 | 1 | 0 | 0 | 0 | 1 | 0 | 0 | 1 |
| 1 | 1 | 0 | 0 | 1 | 0 | 0 | 1 | 0 | 0 | 1 | 0 | 0 | 1 |

MICROPROCESSOR

TECHNICAL FIELD

The present invention relates to a microprocessor capable of operating a particular circuit block at high speed without increasing a consumption power.

BACKGROUND ART

Various techniques of reducing the consumption power of a microprocessor have been proposed. For example, as disclosed in JP-A-8-272579 "Variable Clock Generator", most of conventional techniques intend to reduce the consumption power of a microprocessor by lowering the frequency of a clock to be supplied to a unit not requiring a high speed operation among a plurality of units constituting the microprocessor. Lowering the clock frequency corresponds to lowering an operation ratio (activation ratio) of CMOS circuits because most of microprocessors are made of CMOS circuits. This method is therefore effective for lowering the consumption power.

Recent developments on multimedia fields are remarkable. Microprocessors suitable for multimedia are highly desired. Such a microprocessor is required to execute a complicated process such as graphics and image processing at high speed. There is a recent tendency that a higher frequency is used as the machine clock of a microprocessor. With a higher clock frequency, the consumption power increases. Reducing the consumption power of a microprocessor is an important issue.

Recently, there are many microprocessors prevailing to general homes, such as microprocessors for a digital TV and a game machine. Such microprocessors are required and expected to use inexpensive packages for low cost purposes and to be resistant against a use in a windless state. In order to meet such expectation, a low consumption power of a microprocessor is particularly necessary.

There are high market needs for a high performance and a low consumption power of microprocessors, particularly microprocessors for multimedia fields. However, although conventional techniques can reduce the consumption power of a microprocessor, they do not consider both the reduction in the consumption power and the improvement on the performance.

It is an object of the invention to solve this problem and provide a microprocessor capable of improving the performance of the microprocessor without increasing the consumption power.

DISCLOSURE OF INVENTION

According to the invention, one of a plurality of power supply voltages having different values and one of a plurality of clocks having different frequencies are selectively supplied to each of a plurality of circuit blocks constituting a microprocessor, in order to change the operation speed of a specific circuit block to a higher operation speed. A clock having a higher frequency is called, hereinafter where appropriate, a high speed clock.

Most microprocessors are made of CMOS circuits. In general, the highest operable frequency of logical circuits such as CMOS circuits increases approximately in proportion to a power supply voltage supplied to the circuits. In order to drive a CMOS circuit at a high speed clock, it is therefore necessary to supply a higher power supply voltage. From this reason, the invention utilizes a plurality of power supply voltages. The frequency of each of a plurality of clocks and the value of each of a plurality of supply voltages are selected so that the highest speed clock having a highest frequency among the plurality of clocks can be used by a circuit block supplied with the highest power supply voltage among the plurality of power supply voltages and that one of clocks slower than the highest speed clock can be used by a circuit block supplied with one of power supply voltages lower than the highest power supply voltage. The circuit block supplied with the highest power supply voltage is made of circuit components having a breakdown voltage higher than the highest power supply voltage so that the circuit block can operate normally at the highest power supply voltage.

The invention not only realizes a high speed operation of a microprocessor but also reduces the consumption power. Generally, the consumption power of a logical circuit such as a CMOS circuit is proportional to the operation frequency of the circuit and to the square of a power supply voltage supplied to the circuit. Accordingly, in this invention, the number of circuit blocks supplied with both the highest power supply voltage and highest speed clock is limited.

More specifically, the invention provides:

a power supply circuit for selectively supplying one of a plurality of power supply voltages having different values to each circuit block;

a clock supply circuit for selectively supplying one of a plurality of clocks having different frequencies to each circuit block; and a control circuit for instructing said power supply circuit and said clock supply circuit to selectively supply a clock and a power supply voltage to each circuit block.

When the highest speed clock and highest power supply voltage are supplied to one of the circuit blocks, the control circuit controls to supply one of clocks slower than the highest speed clock and one of power supply voltages lower than the highest power supply voltage to at least one of other circuit blocks.

More specifically, when a clock supplied to at least one of the plurality of circuit blocks is changed to a faster speed clock, a clock supplied to at least one other of the plurality of circuit blocks is changed to a slower speed clock.

In this manner, an increase in the consumption power of one circuit block operating at a higher operation speed is compensated by a reduction in the consumption power of the other circuit block. The total power consumption of the microprocessor can therefore be suppressed lower than a predetermined maximum consumption power.

Using both a high speed clock supplied to one circuit block and a low speed clock supplied to another circuit block can be applied to various modes.

For example, a circuit block can operate at a higher speed than that in a normal operation mode. In this case, a clock higher than that in the normal operation mode is supplied to the circuit block. If necessary, a higher power supply voltage is supplied to the circuit block. For example, if the faster clock is the highest speed clock, the highest power supply voltage is supplied to the circuit block. In this manner, the operation speed of the circuit block is raised. In this case, the clock supplied to one of other circuit blocks is changed to a lower speed clock than that in the normal operation mode.

Alternatively, a circuit block driven by a lower speed clock than the highest speed clock can be driven at the highest speed clock. In this case, the clock supplied to another circuit block is changed to a lower speed clock. For example, if there is a circuit block supplied with the highest speed clock before the clock change, the clock supplied to the circuit block is changed to a lower speed clock.

BEST MODE FOR CARRYING OUT THE INVENTION

Figure 1:
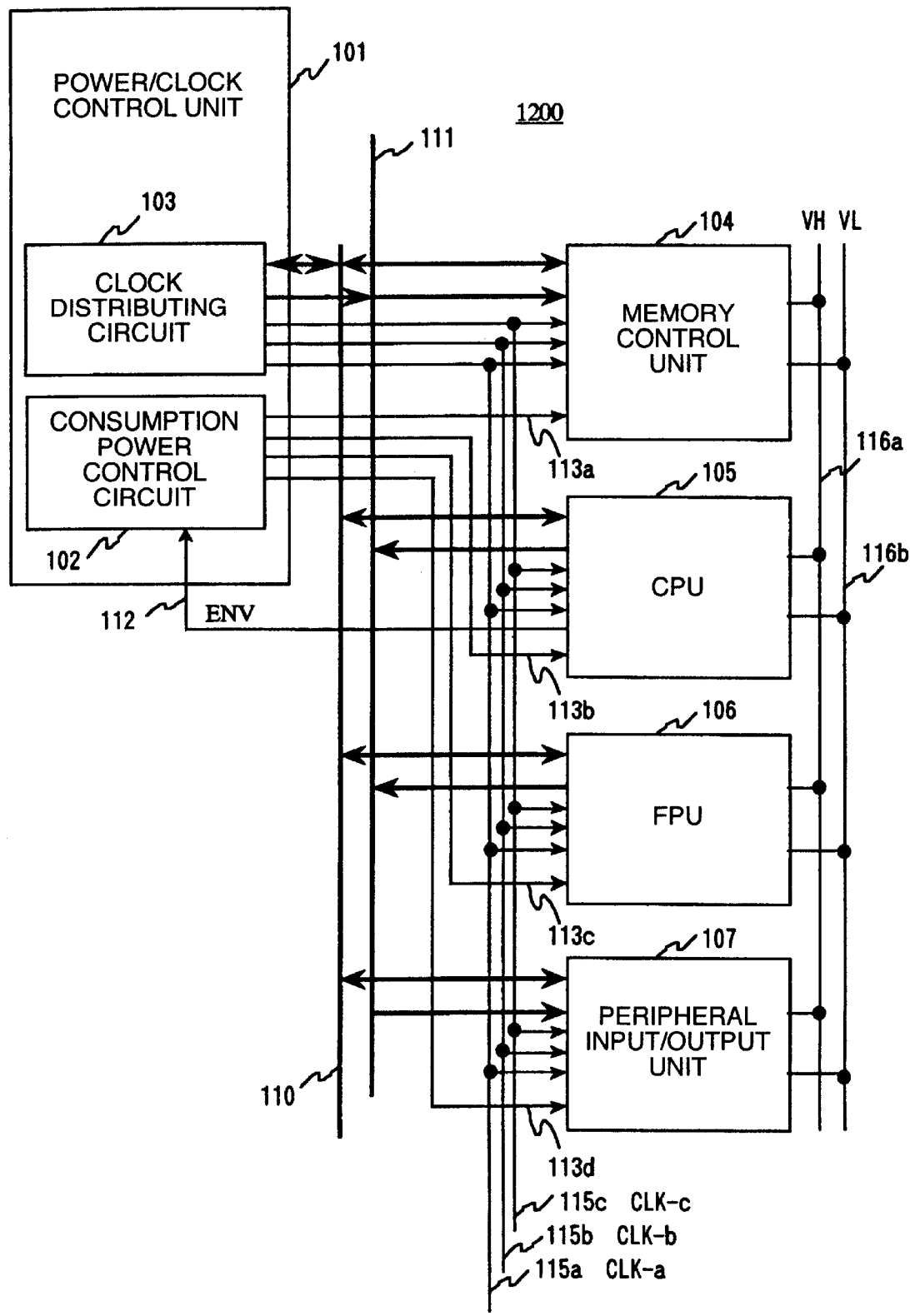
FIG. 1 is a schematic block diagram of a microprocessor according to an embodiment of the invention.

A microprocessor of the present invention will be described in detail in connection with the embodiments shown in the accompanying drawings. In the drawings, identical reference numerals represent identical or similar elements. Only different points of second and following embodiments from the first embodiment will be described mainly.

FIRST EMBODIMENT

As shown in FIG. 1, a microprocessor 1200 is fabricated on a single large scale integrated circuit (LSI) and has a plurality of functional units and a power/clock control unit 101, the functional units including a memory control unit 104, a central processing unit (CPU) 105, a floating point calculation unit (FPU) 106, a peripheral input/output unit 107 and the like. These units are each constituted of one circuit block. Some functional unit may be constituted of a plurality of circuit blocks or a plurality of functional units may be constituted of one circuit block. The unit 101 and functional units 104 to 107 are interconnected by a data bus 110, an address bus 111 and an unrepresented control bus. Although the microprocessor 1200 has memory units such as a random access memory (RAM) and a read-only memory (ROM) connected to the buses, these memory units are not shown and their operations will not be described, for simplicity purposes. These memory units operate synchronously with complicated timings. Therefore, power supply voltages and clocks supplied to these memory units are not changed. It is obvious that other functional units may be added.

The memory control unit 104 has a cache memory (not shown) for an unrepresented RAM and a circuit (not shown) for making the cache memory process an access request to RAM and accessing RAM if data to be accessed is not stored in the cache memory. The memory control unit 104 has also a bus arbiter (not shown) for the busses 110 and 111. As will be later described, the functional units using the busses 110 and 111 are driven at different clocks. Each functional unit determines data transmission and reception timings to and from these busses so that there is no practical problem of use of these busses.

The peripheral input/output unit 107 transfers data between an unrepresented external peripheral unit and CPU 105.

In this embodiment, the functional units 104 to 107 are supplied at a time with a plurality of operation clocks, in this example, three clocks CLK-a, CLK-b and CLK-c having different frequencies, via clock lines 115a to 115c. The clock CLK-a is a highest speed clock having a highest frequency, the clock CLK-b is a middle speed clock having a frequency lower than the highest frequency, and the clock CLK-c is a lowest speed clock having a lowest frequency. The power/clock control unit 101 has a clock distributing circuit 103 for distributing these three clocks. All the functional units are supplied at a time with a plurality of power supply voltages, in this example, two different power supply voltages VH and VL via power lines 116a and 116b.

As will be later described, each functional unit is provided with the circuits same as a clock switching circuit (402 in FIG. 7) and a power switching circuit (401 in FIG. 7). The clock switching circuit and power switching circuit select one clock and one power supply voltage from the three clocks and two power supply voltages supplied to the functional unit. In this embodiment, the clock distributing circuit 103 and the clock switching circuit of each functional unit constitutes a clock supply circuit of this invention. The power switching circuit of each functional unit constitutes a clock supply circuit.

Figure 3:
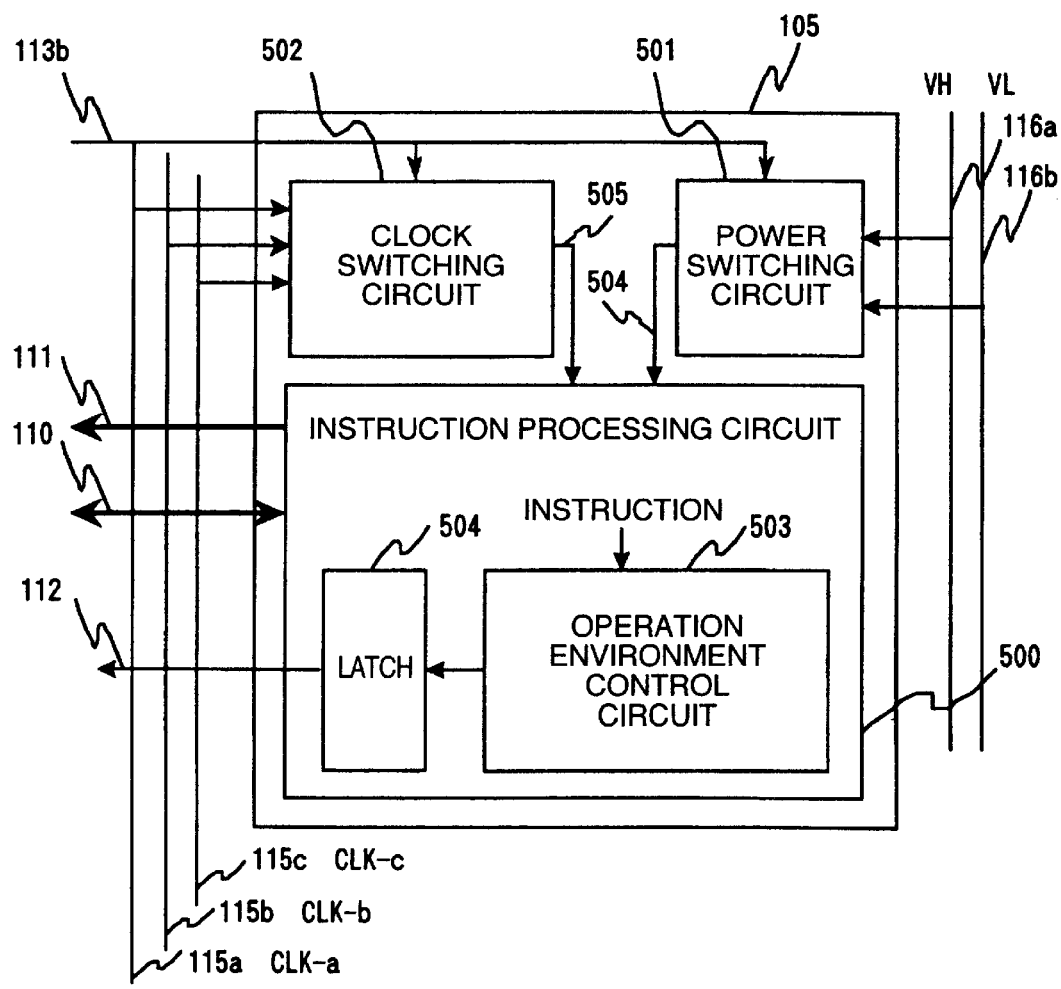
FIG. 3 is a schematic block diagram of a central processing unit of the microprocessor shown in FIG. 1, the unit being suitable for embodying the invention.

As will be later detailed, CPU 105 has an operation environment control circuit 503 (FIG. 3). This circuit generates an operation environment control signal ENV (112) and supplies it to the power/clock control unit 101, when an operation environment change instruction is executed in CPU 105. This signal ENV (112) basically contains information allowing each functional unit to select the clock and power supply voltage to be used.

The power/clock control unit 101 also has a consumption power control unit 102. In response to the operation environment control signal ENV (112), this circuit 102 generates four power/clock switching signals 113a to 113d and supplies them to the clock switching circuits (402 in FIG. 7) and power switching circuits (401 in FIG. 7), in order to control the selection of clocks and power supply voltages to be used at the functional units 104 to 107. In this manner, the operation environment control circuit 503 (FIG. 3) and consumption power control unit 102 function as a control circuit which controls the clock switching circuit and power switching circuit of each functional unit to change the power supply voltage and clock to be used by the functional unit.

In this embodiment, it is assumed that all the functional units use the middle speed clock CLK-b in a normal operation mode. Therefore, the clock CLK-b used in the normal operation mode can be called a regular or base clock of the microprocessor. This clock realizes an operation speed in the normal operation mode or a regular operation speed. The highest speed clock CLK-a is used for realizing an operation speed faster than that realized by the clock CLK-b. The present invention aims not only to reduce a power consumption but also to speed up the operation. The clock CLK-a is used for speeding up the operation. The lowest speed clock CLK-c is used for realizing a low speed operation to reduce the power consumption.

Depending upon the arrangement of the functional unit, it becomes necessary in some cases to use another clock having the same frequency as that of a clock, e.g., clock CLK-a and a different phase from that of clock CLK-a. Although such a clock can be used in this embodiment, it is assumed to be the same as the clock CLK-a, and such a clock is not shown in the drawings and will not be described.

The low power supply voltage VL is a power supply voltage used in the normal operation. This power supply voltage can be called a regular or base power supply voltage of the microprocessor. This power supply voltage is used by the functional unit operating at the clock CLK-b or CLK-c. The high power supply voltage VH is used for realizing an operation faster than the normal operation realized by the power supply voltage VL.

Generally, the highest frequency at which a CMOS circuit can operate increases in proportion to the power supply voltage supplied to the CMOS circuit. Therefore, in order to operate a CMOS circuit at high speed, it is necessary to supply a higher power supply voltage. The circuit block supplied with such a high power supply voltage is made of circuit components having a breakdown voltage higher than such a high power supply voltage so that the circuit block can operate normally at the high power supply voltage.

Also in this embodiment, it is assumed that the microprocessor is made of CMOS circuits. The value of the high power supply voltage VH is set so that the circuits in each functional unit can operate at the highest speed clock CLK-a. This power supply voltage VH is supplied to the functional unit operating at high speed in response to the highest speed clock CLK-a. The value of the low power supply voltage VL is set so that the circuits in each functional unit can operate at the middle speed clock CLK-b. This power supply voltage VL is supplied to the functional unit operating in the normal operation mode at the clock CLK-b. In this embodiment, the power supply voltage VL is also used when the functional unit operates at low speed at the clock CLK-c.

According to the present invention, when the highest speed clock among a plurality of clocks prepared for circuit blocks is supplied to any one of the circuit blocks, the highest power supply voltage among a plurality of power supply voltages prepared for the circuit blocks is supplied to the circuit block. Conversely, when the power supply voltage lower than the highest power supply voltage among the plurality of power supply voltages is supplied to any one of the circuit blocks, a clock slower than the highest speed clock among the plurality of clocks is supplied to the circuit block.

The present invention realizes not only a high speed operation of the microprocessor but also a low consumption power thereof. The clock and power supply voltage used by each circuit block are selected so as to meet these two requirements of the high speed operation and low consumption power. Generally, the consumption power of a CMOS circuit is proportional to the operation frequency of the CMOS circuit and to the square of the power supply voltage supplied to the circuit. Therefore, if the highest speed clock CLK-a and higher power supply voltage VH are supplied to all the circuit blocks, the consumption power of the microprocessor increases far more than the normal operation (in this example, the middle speed clock CLK-b and lower power supply voltage VL are supplied to all the circuit blocks).

However, in practice, it is not necessary in some cases to speed up all the circuit blocks in order to speed up a process time of a program to be executed by the microprocessor. Accordingly, in the present invention, not all the circuit blocks are speeded up at the same time, but one or more circuit blocks are selectively speeded up which contribute to shorten a program process time. To this end, one or more circuit blocks are supplied with faster clocks and higher power supply voltages. In the example shown in FIG. 1, the highest speed clock CLK-a and higher power supply voltage VH are used.

Only with this arrangement, the consumption power of the microprocessor becomes larger than that in the normal operation mode. According to the invention, therefore, when the operation clock for any one of the circuit blocks is raised, the operation clocks for other circuit blocks are lowered. In this manner, the total consumption power of the microprocessor is set lower than a predetermined maximum consumption power of the microprocessor. More specifically, in the example shown in FIG. 1, the clock used by other function units are changed from the clock CLK-b in the normal operation to the power saving clock CLK-c. An increase in the consumption power of the function unit using the clock CLK-a can therefore be compensated by a decrease in the consumption power of the function unit using the clock CLK-c.

As described above, according to the present invention, when a clock, or a clock and a power supply voltage supplied to one of a plurality of circuit blocks are changed to a faster clock, or a faster clock and a corresponding higher power supply voltage, the clock supplied to at least one other circuit block among the plurality of circuit blocks is changed to a slower clock.

In the case of a microprocessor incorporating conventional techniques, the frequency of a clock supplied to one of functional units is lowered to change the consumption power of the functional unit, although the performance of a particular functional unit will not be improved. Namely, according to conventional techniques, all functional units are operated at a constant clock in the normal operation state, and when it becomes thereafter that the process performance of any functional unit, e.g., CPU and FPU, can be degraded, the frequency of the clock supplied to these two functional units is lowered more than that in the normal operation mode. The consumption power of the microprocessor can therefore be lowered greatly. When it becomes thereafter that the process performance of only CPU can be degraded, the frequency of only CPU is lowered. Also in this case, the consumption power lowers more than that in the normal operation mode. According to these conventional techniques, the performance of a functional unit is degraded in order to lower the consumption power of the functional unit. These conventional techniques do not teach the technique that a functional unit is operated at higher speed than that in the normal operation mode. Accordingly, the conventional techniques do not teach the technique of using a clock having a frequency higher than that in the normal operation mode or using a corresponding power supply voltage higher than that in the normal operation mode.

Figure 2:
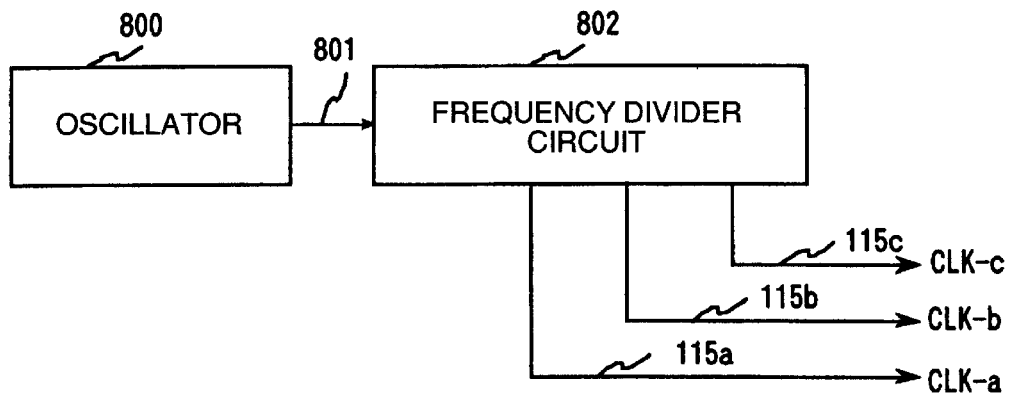
FIG. 2 is a schematic block diagram of a clock distributing circuit of the microprocessor shown in FIG. 1, the circuit being suitable for embodying the invention.

The embodiment will be further detailed. As shown in FIG. 2, the clock distributing circuit 103 of the power/clock control unit 101 has a usual structure made of an oscillator 800 and a frequency divider 802. A base clock 801 output from the oscillator 800 is input to the frequency divider 802 which divides the base clock to generate the clocks CLK-a to CLK-c.

As shown in FIG. 3, CPU 105 has an instruction processing circuit 500 for executing a process essential for CPU, a clock switching circuit 502 and a power switching circuit 501. An operation environment control circuit 503 and a latch 504 are provided in the instruction processing circuit 500.

In this embodiment, an instruction for changing an operation environment is newly added to a program under execution. This instruction includes a specific operation code and an operand. The operand designates a plurality of operation environments to be realized by the microprocessor. Each operation environment represents one of different combinations of the clock and power supply voltage to be supplied to each functional unit. In this embodiment, four operation environments to be described later are used. Therefore, the operand has two bits. The operation environment control circuit 503 decodes this instruction and outputs an operand of two bits to the latch 504. The two-bit operand latched by the latch 504 is sent as the operation environment control signal ENV (112) to the consumption power control circuit 102 of the power/clock control unit 101. In response to this signal 112, the consumption power control unit 102 changes the operation environment of the microprocessor. This operation will be later described.

The instruction processing circuit 500 includes various circuits for executing various instructions to be described later, an integer calculation circuit and a group of internal registers. These circuits are not shown in the drawings for simplicity purposes. In order to read an instruction from an unrepresented ROM or RAM, the instruction processing circuit 500 sends a memory access instruction to the memory control unit 104 by using the address bus 111 and unrepresented control bus. If the instruction is read from the unrepresented cache memory in the memory control unit 104 or from an unrepresented RAM or ROM, the instruction processing circuit 500 decodes the instruction and controls the execution of the instruction. If the decoded instruction is a data access instruction to the unrepresented ROM or RAM, a memory access request is sent to the memory control unit 104 by using the data bus 110, address bus 111 and unrepresented control bus. If the decoded instruction is an integer calculation instruction, the integer calculation circuit (not shown) in the instruction processing circuit 500 executes a calculation requested by the instruction. If the decoded instruction is a floating point calculation instruction, this instruction is sent to FPU 106 which executes the instruction. Similarly, if the decoded instruction is an instruction of using the peripheral input/output unit 107, this instruction is sent to the unit 107.

Figures 4, 5:
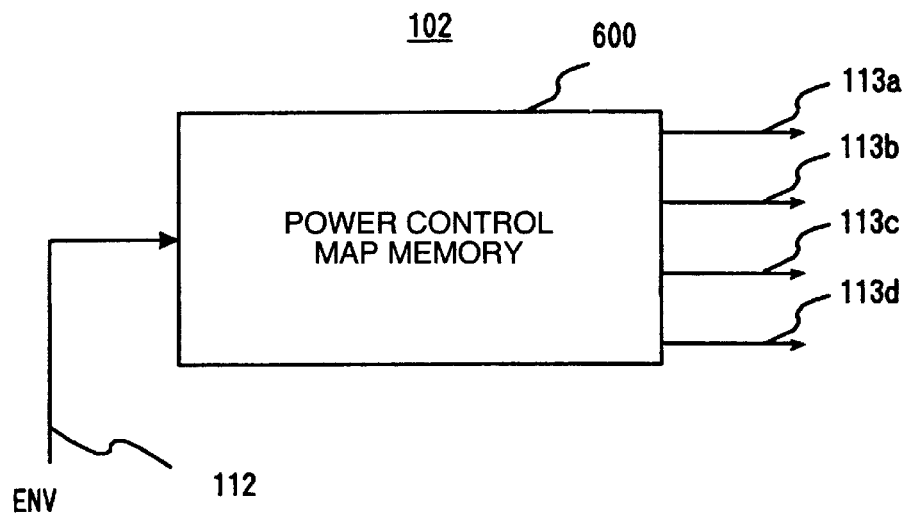
FIG. 4 is a schematic block diagram of a consumption power control circuit of the microprocessor shown in FIG. 1, the unit being suitable for embodying the invention.
FIG. 5 is a diagram showing the contents of a power control map memory of the consumption power control circuit shown in FIG. 5.

As shown in FIG. 4, the consumption power control circuit 102 of the power/clock control unit 101 has a power control map memory 600. This memory stores a power control map containing information for generating power/clock switching signals 113a to 113d. In this embodiment, this memory 600 is made of a ROM. This ROM stores a set of power/clock switching signals 113a to 113d corresponding to each of the values of the operation environment control signal ENV (112) at the address position represented by the value of the signal ENV (112). The power/clock switching signals 113a to 113d are supplied to the memory control units 104, CPU 105, FPU 106 and peripheral input/output unit 107, respectively. A gate circuit capable of generating the power/clock switching signals may be used in place of the power control map memory 600.

In this embodiment, for example, the operation environment control signal ENV (112) has two bits (d1, d0), and the power/clock switching signals 113a to 113d each have three bits (p, c1, c0). FIG. 5 shows the contents of the power control map memory 600. The bit p is a power supply voltage selection bit, p=0 selects the power supply voltage (VL) and p=1 selects the high power supply voltage (VH). The bits (c1, c0) are clock selection bits for selecting the clock in the following manner:

(c1, c0)=(0, 0): middle speed clock CLK-b
(c1, c0)=(0, 1): lowest speed clock CLK-c
(c1, c0)=(1, 0): highest speed clock CLK-a
(c1, c0)=(1, 1): not used.

In this embodiment, the following four operation modes are used.

(A) All functional units: normal operation

It is assumed herein that all the functional units of the microprocessor shown in FIG. 1 are driven at the middle speed clock CLK-b and lower power supply voltage VL in the normal operation mode. In this case, (d1, d0)=(0, 0). As seen from FIG. 5, all the power/clock switching signals 113a to 113d take (0, 0, 0) in this mode. This operation mode is used when the power of the microprocessor is turned on or when the operation environment change instruction indicating to use this operation mode is executed after the completion of one of the following operation modes.

The total maximum consumption power of a microprocessor is determined from the package, cooling condition and the like. Irrespective of how the functional units constituting a microprocessor are operated, it is necessary to design the microprocessor so that the total consumption power thereof does not exceed the maximum consumption power. For simplicity purposes, only the consumption powers of the functional units 104 to 107 whose clocks and power supply voltages are to be changed are discussed. This discussion is made on the assumption that the consumption powers or maximum consumption powers of these functional units are the total consumption power or total maximum consumption power of the microprocessor.

Figure 6:
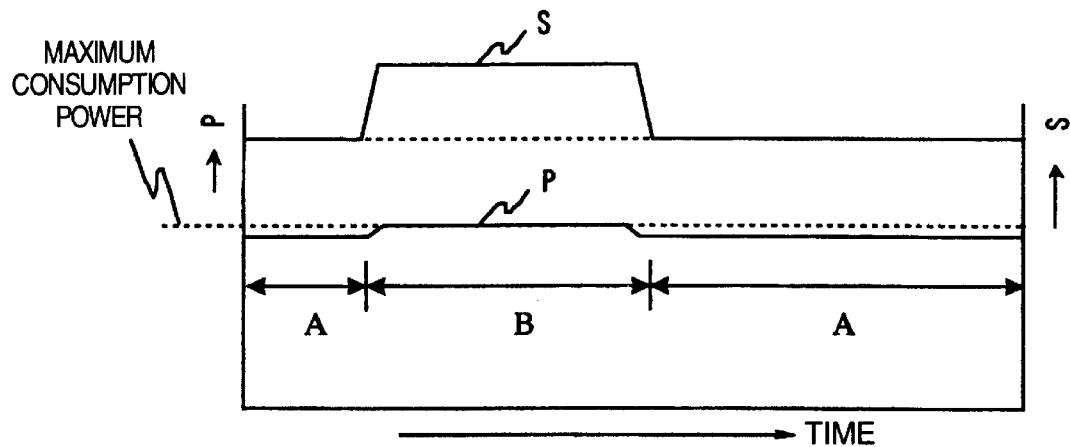
FIG. 6 is a diagram illustratively showing a change in the consumption power and processing speed of the microprocessor shown in FIG. 1.

The consumption power P of the microprocessor in this operation mode is set so that this power P does not exceed the maximum consumption power indicated by a broken line in a section A shown in FIG. 6. For example, it is assumed that the maximum consumption power of the microprocessor is 2.1 watt, the lower power supply voltage VL is 2.0 volt, the middle speed clock CLK-b is 200 MHz, and the consumption power in the normal operation mode is 2.0 watt. It is also assumed that the ratio of the consumption powers in the normal operation mode of the memory control unit 104, CPU 105, FPU 106 and peripheral input/output unit 107 is 0.15:0.3:0.3:0.25. Namely, in the normal operation mode, the consumption powers of these functional units are 0.3, 0.6, 0.6 and 0.5 watt, respectively.

(B) FPU high speed operation

In this mode, FPU 106 and memory control unit 104 are driven at high speed by supplying the highest speed clock CLK-a and higher power supply voltage VH. CPU 105 and peripheral input/output unit 107 are driven at low speed by supplying the lowest speed clock CLK-c and lower power supply voltage VL.

In this mode, (d1, d0)=(0, 1). As seen from FIG. 5, in this mode, both the power/clock switching signals 113a and 113c for the memory control unit 104 and FPU 106 take (1, 1, 0). The power/clock switching signals 113b and 113d for CPU 105 and peripheral input/output unit 107 take (0, 0, 1).

This operation mode is used, for example, when most of instructions of a program portion to be executed by CPU 105 are instructions indicating the use of FPU 106. In this mode, the clock used by CPU 105 and peripheral input/output unit 107 are changed to a slower clock so that although the operation speed of these functional units are lowered, this lowered speed of the functional units does not pose a practical problem unless the program process speed is not lowered. It is therefore necessary to select functional units whose lowered operation speed will not adversely affect the program process speed. Such a selection is possible for a particular program. A program portion requiring an improved performance of FPU 106 has generally a low use frequency of CPU 105 so that the activation factor of circuits in CPU 105 is low. It can therefore be considered that the low speed operation of CPU 105 does not influence greatly the total process performance of the microprocessor.

In the example shown in FIG. 1, if the clock of any one of the functional blocks is to be changed, a specific instruction is contained in a program to be executed by CPU 105, and after CPU 105 decodes this instruction, the clock is changed.

In this mode, the memory control unit 104 is also driven at high speed because it is necessary to read instructions at high speed from the unrepresented RAM or ROM or from the unrepresented cache memory of the memory control unit 104 and to read at high speed the data to be used by the instructions from RAM or ROM or from the unrepresented cache memory or to write at high speed the data obtained by executing the instructions into these memories.

When this operation mode is changed from the normal operation mode, the clock frequency and power supply voltage of FPU 106 are increased more than those in the normal operation mode. As a result, the performance S of FPU 106 becomes maximum as shown in a section B shown in FIG. 6. On the other hand, the frequency of the clocks supplied to CPU 105 and peripheral input/output unit 107 is lowered. When FPU 106 is driven at speed higher than that in the normal operation mode, it can be said that an increase in the consumption power caused by the high speed operation of FPU 106 is compensated by the low speed operations of CPU 105 and peripheral input/output unit 107.

In this embodiment, the power supply voltages of CPU 105 and peripheral input/output unit 107 are not lowered but the clocks of CPU 105 and peripheral input/output unit 107 are changed from the normal clock CLK-b used before the operation environment change to the lowest speed clock 115c, to thereby realize a low consumption power of CPU 105 and peripheral input/output unit 107. In this manner, the total consumption power of the microprocessor is made not to exceed the maximum consumption power.

The frequencies of the highest speed clock CLK-a and lowest speed clock CLK-c are therefore determined so that a decrease in the consumption power of the functional units using the clock CLK-c instead of the clock CLK-b can compensate for an increase in the consumption power of the functional units using the clock CLK-a instead of the clock CLK-b.

It is assumed, for example, that the highest speed clock CLK-a is 250 MHz, the lowest speed clock CLK-c is 50 MHz and the higher power supply voltage VH is 2.5 V. In this operation mode, the consumption power of the memory control unit 104 is 0.585 watt, the consumption power of FPU 106 is 1.758 watt, the consumption power of CPU 105 is 0.15 watt, and the consumption power of the peripheral input/output unit 107 is 0.125 watt, totalling in 2.03 watt. Also in this mode, as shown in the section B of FIG. 6, the consumption power of the microprocessor can be suppressed lower than the maximum consumption power of 2.1 watt although it increases slightly from the consumption power of 2.0 watt in the normal operation mode.

(C) CPU : high speed operation

In this mode, CPU 105 and memory control unit 104 are driven at high speed by supplying the highest speed clock CLK-a and higher power supply voltage VH. FPU 106 and peripheral input/output unit 107 are driven at low speed by supplying the lowest speed clock CLK-c and lower power supply voltage VL.

In this mode, (d1, d0)=(1, 0). As seen from FIG. 5, in this mode, both the power/clock switching signals 113a and 113c for the memory control unit 104 and CPU 105 take (1, 1, 0). The power/clock switching signals 113c for FPU 106 and peripheral input/output unit 107 take (0, 0, 1).

When the mode is changed to this mode from the normal operation mode, the clock frequency and power supply voltage of CPU 105 are increased more than those in the normal operation mode. The clock frequencies of FPU 106 and peripheral input/output unit 107 are lowered correspondingly, similar to the above-described FPU high speed mode.

In this embodiment, therefore, when any one of the functional units is driven at speed higher than that of the normal operation mode, another of the functional units is driven at low speed. When the mode is changed to this operation mode from the FPU high speed operation mode, the clock frequency of CPU 105 is raised. In this embodiment, therefore, the clock frequency of another functional unit, FPU, is lowered. When the mode is changed to this mode from the FPU high speed operation mode, the clock frequency of CPU 105 is changed to the highest speed clock and the power supply voltage thereof is changed to the higher power supply voltage. In this embodiment, therefore, the clock frequency and power supply voltage of another functional unit, FPU 106, already supplied with the highest speed clock and larger power supply voltage, are changed to a slower clock and a lower power supply voltage.

This mode is used when most of instructions in a program portion to be executed by CPU 105 are instructions of using an unrepresented integer calculation circuit of CPU 105. An increase in a consumption power caused by the high speed operation of CPU 105 is compensated by the low speed operation of FPU 106. This mode is used when the operation environment change instruction designating this mode is executed. The reason of the high speed operation of the memory control unit 104 is the same as that of the mode (B).

(D) All functional units: power saving operation

In this mode, all the functional units are driven at the lowest speed clock CLK-c and lower power supply voltage VL. In this mode, (d1,d0)=(1, 1). In this mode, as seen from FIG. 5, all the power/clock switching signals 113a to 113c are (0, 0, 1). This mode is used, for example, when the program does not require many processes by CPU 105 and FPU 106, e.g., when reception of external data is waited for. When the mode is changed from this power saving mode to another mode, although there is a functional unit driven at speed higher than that in the power saving mode, not all the functional units are driven at low speed. The invention is therefore not applicable to such a case. This is because the power saving operation mode is an operation mode using the minimum consumption power so that it is not necessary to reduce the consumption power of any one of the functional units even if this operation mode is changed to any one of the other operation modes. It is obvious that the invention is not applied to such an operation mode change.

The functional units 104 to 107 are structured in the following manner in order to respond to the power/clock switching signals 113a to 113d.

Figure 7:
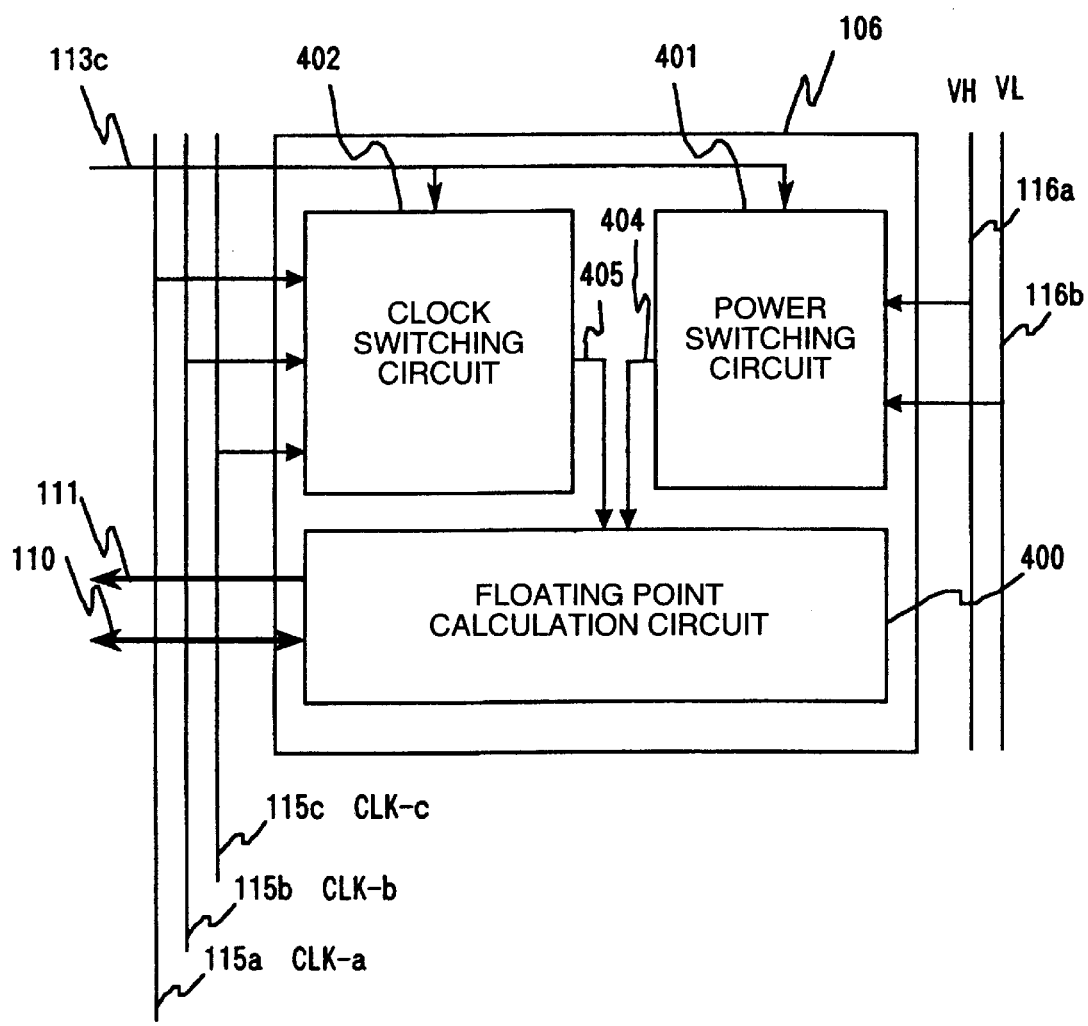
FIG. 7 is a diagram showing the structure of a floating point unit of the microprocessor shown in FIG. 1, the unit being suitable for embodying the invention.

As shown in FIG. 7, FPU 106 has a floating point calculation circuit 400 for executing a floating point calculation, a clock switching circuit 402 and a power switching circuit 401.

Figure 8:
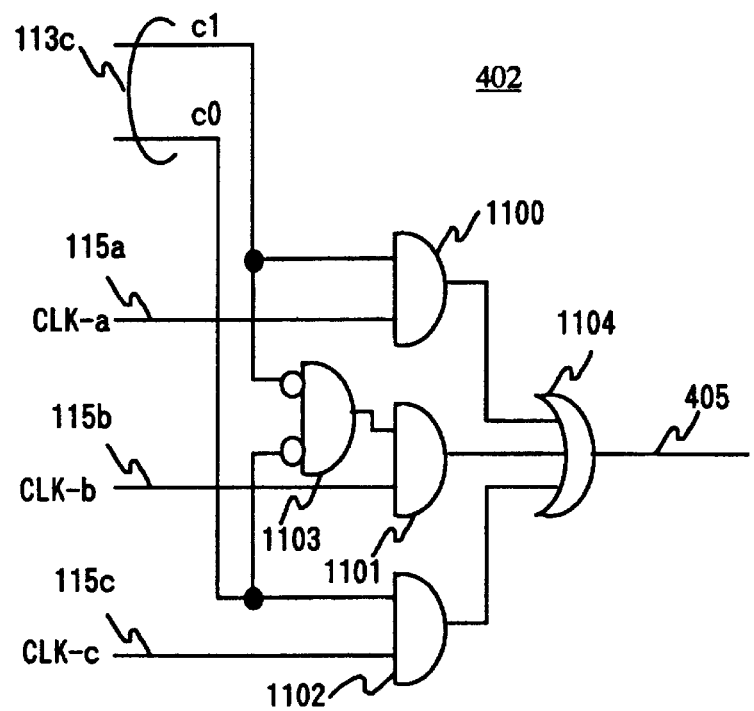
FIG. 8 is a schematic block diagram of a clock switching circuit according to an embodiment of the invention.

In response to the power/clock switching signal 113c supplied from the consumption power control circuit 102, the clock switching circuit 402 selects one of the three clocks CLK-a to CLK-c supplied from the clock distributing circuit 103 via the lines 115a to 115c. For example, as shown in FIG. 8, the clock switching circuit 402 is constituted of AND gates 1100, 1101 and 1102, an OR gate 1104 and a NAND gate 1103 for selecting one of the three clocks on the lines 115a to 115c. When two bits (c1, c0) of the three-bit power/clock switching signal 113c take (0, 0), (0, 1) or (1, 0), the clock switching circuit 402, selects the middle speed clock CLK-b, lowest speed clock CLK-c, or highest speed clock CLK-a, and supplies it via a line 405 to the floating point calculation circuit 400 of FPU 106.

Figure 9:
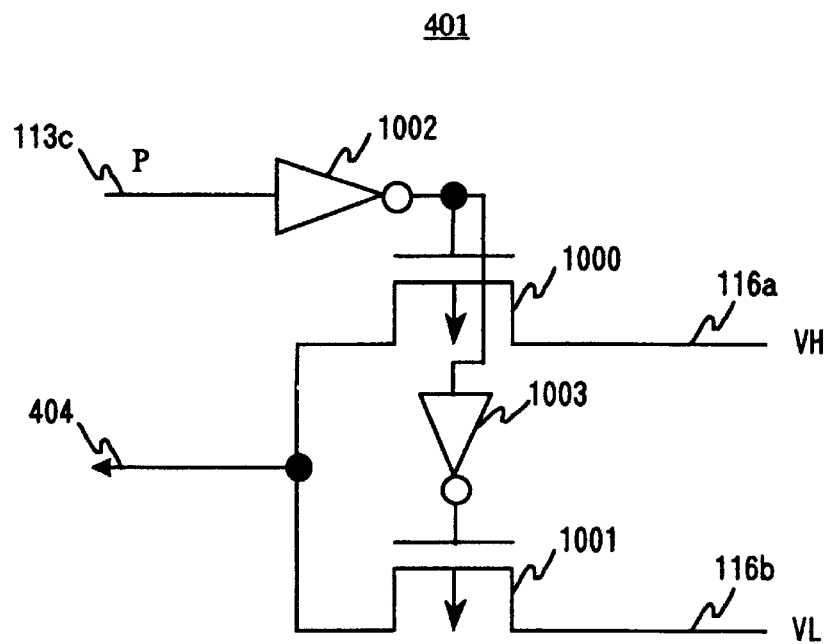
FIG. 9 is a schematic block diagram of a power switching circuit according to an embodiment of the invention.

In response to the power/clock switching signal 113c, the power switching circuit 401 selects one of the power supply voltages VH and VL supplied via the power lines 116a and 116b. For example, as shown in FIG. 9, the power switching circuit 401 is constituted of MOS switches 1001 and 1002 for switching between the two power supply voltages VH and VL and buffer circuits 1002 and 1003 for driving the MOS switches. When the p bit of the three-bit power/clock switching signal 113-c is 0 or 1, the power switching circuit 401 selects the power supply voltage VL or VH. The selected power supply voltage is supplied via a power line 404 to the floating point calculation circuit 400 of FPU 106.

The power switching circuit 401 and clock switching circuit 402 provided in FPU 106 supply a power supply voltage and clock to the floating point calculation circuit 400. These circuits 401 and 402 can be considered that they substantially supply the power supply voltage and clock to FPU 106. These circuits 401 and 402 may be provided outside of FPU 106. In this specification, these circuits 401 and 402 are called, where appropriate, a circuit for supplying a power supply voltage and clock to FPU 106. This is also applied to other functional units.

As shown in FIG. 3, CPU 105 has the instruction processing circuit 500, a power switching circuit 501 and a clock switching circuit 502. These circuits 501 and 502 are the same as the power switching circuit 401 and clock switching circuit 402 shown in FIGS. 9 and 8, and respond to the power/clock switching circuit 113b. The memory control unit 104 has the same structure as the clock switching circuit 402 and power switching circuit 401 of FPU 106 and is provided with a circuit (not shown) for responding to the power/clock switching signal 113d. The peripheral input/output unit 107 has also the same structure as the clock switching circuit 402 and power switching circuit 401 of FPU 106 and is provided with a circuit (not shown) for responding to the power/clock switching signal 113a.

Figure 10:
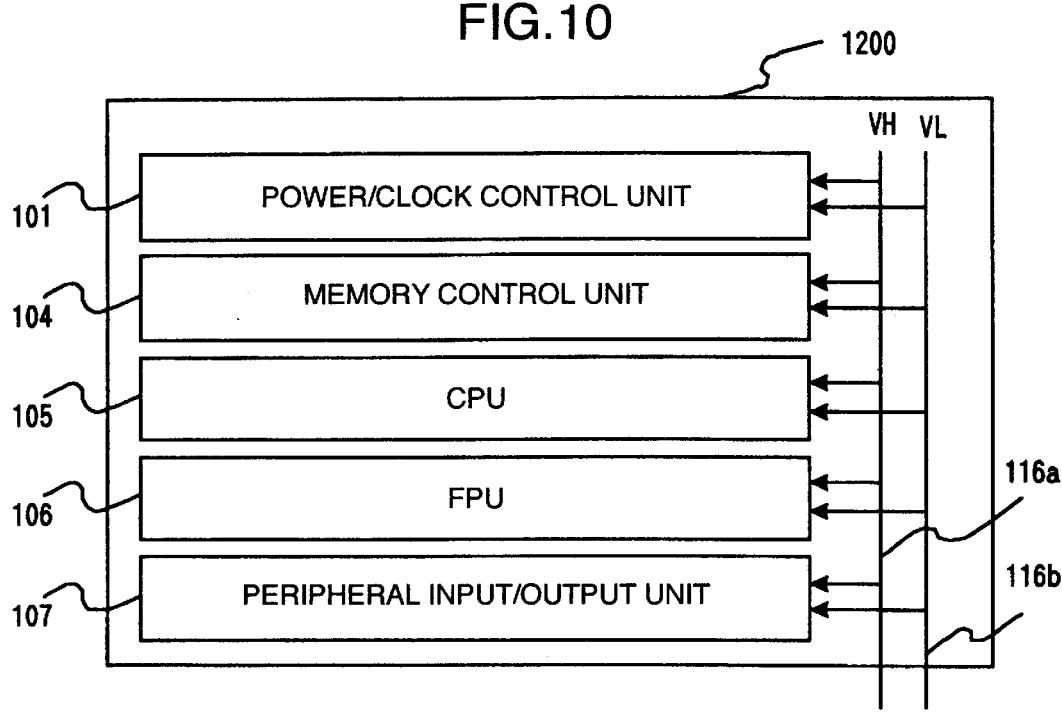
FIG. 10 is a schematic block diagram of a power supply unit according to an embodiment of the invention.

In order to supply a power to the microprocessor, external two power supply voltages VH and VL are directly applied via the power lines 116a and 116b to the unit 101 and functional units 104 to 107, as shown in FIG. 10.

Figure 11:
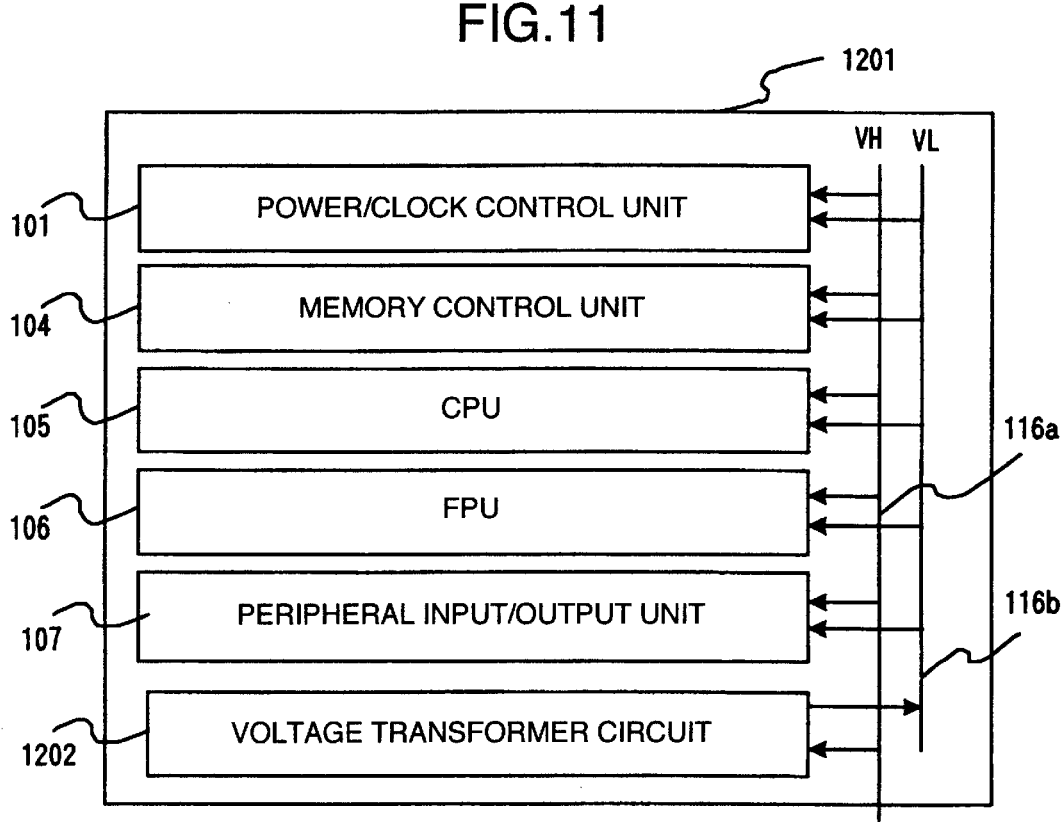
FIG. 11 is a schematic block diagram of a power supply unit according to another embodiment of the invention.

Alternatively, as shown in FIG. 11, an external power supply voltage, e.g., VH is supplied to the microprocessor 1201 and another power supply voltage VL is generated by a voltage transformer circuit 1202.

In this embodiment, when a high speed performance is requested for a particular functional unit, e.g., floating point calculation unit, the clock frequency of the functional unit is raised to drive the unit and realize a high performance, by using a program. An increase in the consumption power caused by this high performance operation is compensated by lowering the clock frequency of another functional unit to make the total consumption power of the microprocessor not exceed the predetermined consumption power.

SECOND EMBODIMENT

In this embodiment, the power control map memory 600 of the consumption power control circuit 102 is made of a RAM. The control information in the power control map memory 600 can therefore be renewed by software, allowing the processor to be controlled in various ways.

Figure 12:
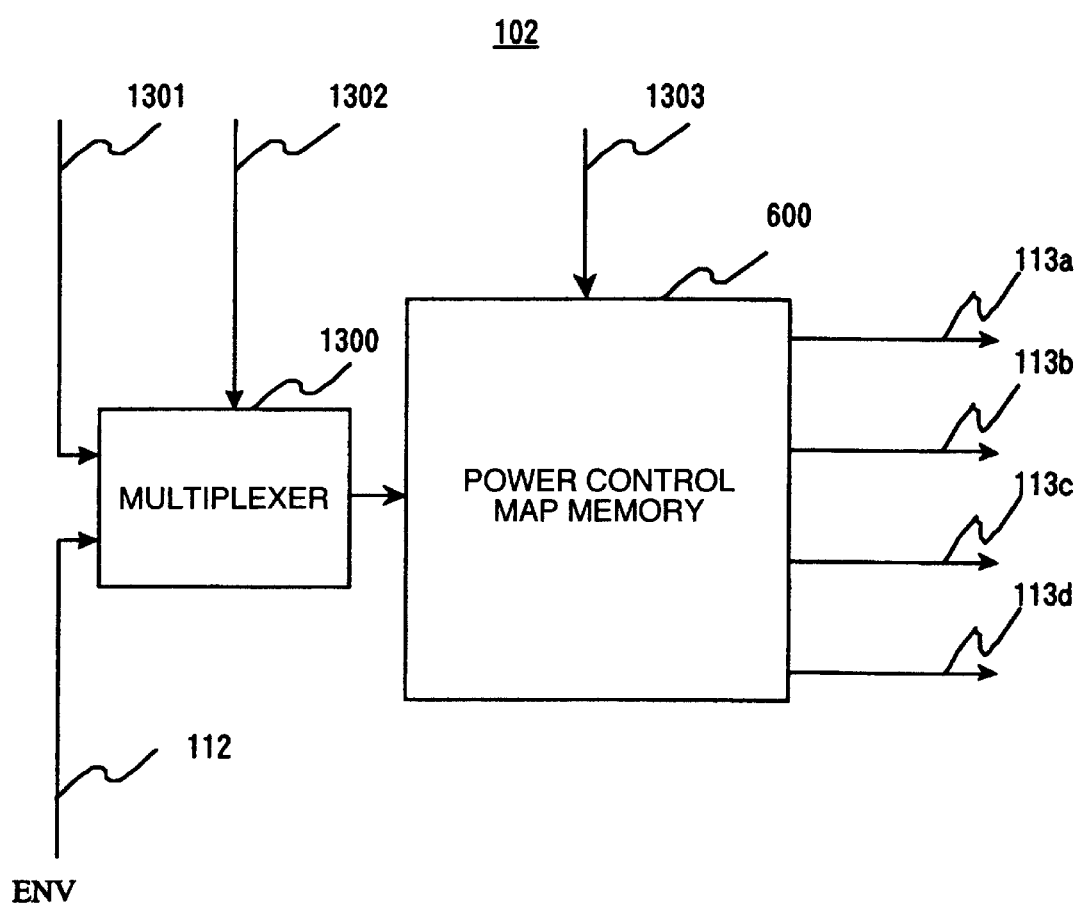
FIG. 12 is a diagram showing the structure of a consumption power control circuit according to another embodiment of the invention.

As shown in FIG. 12, a multiplexer 1300 is connected to the front stage of the power control map memory 600 made of RAM. An instruction of rewriting the contents of the power control map memory 600 is inserted in a program to be executed by CPU 105. CPu 105 is provided with a circuit for decoding this instruction, generating a source selection signal 1302, and outputting a map address 1301 and map update data 1303 designated by the instruction.

When the source selection signal 1302 is not supplied, the multiplexer 1300 selects the operation environment control signal ENV (112) and reads a set of the power/clock switching signals 113a to 113d from the power control map memory 600, similar to the first embodiment. When the source selection signal 1302 is supplied, the multiplexer 1300 selects the map address 1301, supplies it as the write address to the power control map memory 600, and instructs to write the map update data 1303. In this manner, by using the program, the contents of the power control map memory 600 can be rewritten as desired.

THIRD EMBODIMENT

The microprocessor of the first and second embodiments is a general microprocessor. A microprocessor of a different type, particularly a microprocessor for multimedia, uses one or more functional units for executing specific processes such as graphics and image processing, by replacing FPU by these units. In order to drive these functional units at high speed, the techniques described above are applicable. Such specific processes generally take a long process time. It is therefore effective to drive at high speed the functional unit executing such a specific process in order to improve the process speed of the microprocessor. Also in this case, the total consumption power of the microprocessor can be suppressed lower than the maximum consumption power.

Modifications

Some modifications of the embodiments have already been given in the foregoing description. Other modifications will be described in the following. It is obvious that the invention is not limited only to the embodiments, but the invention may be realized by the already-described modifications and other modifications.

(1) In the first embodiment, the peripheral input/output unit 107 operates only in the normal operation mode or power saving mode. This unit may operate at high speed. For example, if a peripheral input/output unit for a modem is used as this unit 107, it may be desired that this functional unit operates at high speed.

(2) In the first embodiment, the clock generation unit 103 is used in common for all the functional units and a plurality of clocks are supplied at the same time to all the functional units via a plurality of common clock lines. Instead, the power/clock switching unit may be provided with a clock switching circuit for each functional unit which selects a clock and supplies the selected clock to the functional unit via its clock line. Alternatively, a clock switching circuit common for all the functional units may be provided which outputs the clock for each functional unit. Such a circuit is also considered in this invention as a circuit for switching clocks for each functional unit.

In the first embodiment, signal lines for supplying all clocks to all the functional units are used. However, in this modification, only one clock signal is used for each functional unit. Therefore, a chip area occupied by clock lines may be reduced.

Similarly, in the first embodiment, a plurality of power supply voltages are supplied at the same time to all the functional units via a plurality of common power lines, and the power supply switching circuit is provided for each functional unit. Instead, a power supply voltage switching circuit may be structured in the manner similar to the modification of the clock switching circuit. Such a circuit is also considered in this invention as a circuit for switching power supply voltages for each functional unit.

Since the power supply voltage switching circuit requires to switch large currents, there is a possibility that the power supply voltage to be supplied to other circuits may fluctuate. It is therefore preferable in some cases to form this circuit outside of each functional unit, particularly in a chip peripheral area. Similarly, it is preferable in some cases to form the clock switching circuit outside of each functional unit, particularly in a chip peripheral area.

(3) In the first embodiment, all the functional units operate in the normal operation mode at the same clock and same power supply voltage. The invention is not limited only to this, but in the normal operation mode, the clock or the clock and power supply voltage supplied to one of the functional units may be different from the. clock or the clock and power supply voltage supplied to the other functional units.

Specifically, in the normal operation mode, the clock supplied to one of the functional units may have a frequency lower than the clock supplied to the other functional units. For example, in the normal operation mode, the lowest speed clock CLK-c may be supplied only to FPU 106 or peripheral input/output unit 107 to operate it in the power saving mode, and the middle speed clock CLK-b and lower supper supply voltage VL are supplied to the other functional units. In this case, when FPU 106 is changed to operate at the middle speed clock CLK-b or highest speed clock CLK-a, the clock supplied to the other functional units, e.g., CPU 105 is changed to the lowest speed clock CLK-c.

In the normal operation mode, the clock supplied to one of the functional units may have a frequency higher than the clock supplied to the other functional units. For example, in the normal operation mode, the highest speed clock CLK-a and higher power supply voltage VH may be supplied only to CPU 105 to operate it in the high speed operation mode, and the middle speed clock CLK-b and lower power supply voltage VL are supplied to the other functional units. In this case, when FPU 106 is changed to operate at the highest speed clock CLK-a and higher power supply voltage VH, the clock supplied to the other functional units, e.g., CPU 105 is changed to the middle speed or lowest speed clock CLK-b or CLK-c.

(4) It is obvious that the invention is applied to the case that four or more clocks are used instead of the three clocks of the first embodiment. It is also obvious that the invention is applied to the case that three or more power supply voltages are used instead of the two power supply voltages of the first embodiment. Also in this case, if the highest speed clock is used for one of the functional units, the highest power supply voltage is used, whereas if a power supply voltage lower than the highest power supply voltage is used, a clock having a frequency lower than that of the highest speed clock is used.

(5) In the first embodiment of the invention, when the operation mode of one of the function units is changed from the normal operation mode to the high speed operation mode, the operation speed of the other functional units is lowered. If four or more clocks and three or more power supply voltages are used and when the clock of one of the functional units is changed from a clock different from the highest speed clock to a clock having a higher speed clock different from the highest speed clock, the other functional units supplied with a clock having a speed lower than the highest speed clock are changed to have a lower speed clock. In this manner, the total consumption power of the microprocessor can be suppressed lower than the maximum consumption power.

(6) In the embodiments, in the power saving mode, the power supply voltage same as that in the normal operation mode is supplied to each functional unit and only the clock is changed to the lower speed clock. A power supply voltage for the power saving mode may be prepared and supplied to the functional units in the power saving mode. In this manner, the consumption power of each functional unit in the power saving mode can be reduced further.

(7) It is obvious that the invention is applicable to the case that four operation modes different from those of the first embodiment are used or five or more operation modes are used.

(8) In the first embodiment, each functional unit of the microprocessor is realized by one circuit block. The invention is generally applicable to a microprocessor having a plurality of circuit blocks. It is not necessary that the whole of a circuit block is driven by the same clock and power supply voltage, but a portion of the circuit block may be driven by a different clock and power supply voltage.

In the first embodiment, when the clock supplied to one of the functional units is changed from the middle speed clock CLK-b to the lowest speed clock CLK-c, the lower power supply voltage remains unchanged. Instead, a lowest power supply voltage for the lowest speed clock CLK-c may be prepared to use it with this clock CLK-c. The consumption power of the circuit block supplied with the lowest speed clock CLK-c can therefore be reduced further, although the number of necessary power supply voltages increases and the number of switching times of the power supply voltage to be supplied to each circuit block increases, respectively more than the first embodiment.

(10) The invention is not limited only to a microprocessor made of CMOS circuits, but obviously is also applicable to a microprocessor made of other circuits such as BiCMOS circuits.

(11) In the first embodiment, in the normal operation mode, the lower power supply voltage VL and middle speed clock CLK-b are supplied to all the functional units, and when one of the functional units is to be operated at high speed, the highest speed clock CLK-a and higher power voltage VH are supplied to this functional unit. Instead of the lower power supply voltage, the higher power supply voltage VH and middle speed clock CLK-b may be supplied to all the functional units in the normal operation mode.

(12) In the first embodiment, a clock and a power supply voltage having a constant frequency and a constant voltage are supplied to a specific circuit block of unrepresented RAM and ROM. Even if the frequency of a clock supplied to a specific circuit block is not changed, the invention is applicable to the case that the frequencies of clocks supplied to a plurality of other circuit blocks are changed for each circuit block. It is obvious that the invention is applicable to the case that the frequencies of clocks supplied to all circuit blocks are changed. Similarly, the invention is applicable to the case that the frequency of one of the circuit blocks is changed under the condition that the frequency of the circuit block is the same as that of another of the circuit blocks. In this invention, a clock supply circuit is used which can change the clock of at least a plurality of circuit blocks among all circuit blocks of a microprocessor. In other words, so long as the clock supply circuit capable of changing the frequencies of clocks to be supplied to some of circuit blocks is used, it can be considered that the clock supply circuit selects a clock having a different frequency and supplies it to each of a plurality of circuit blocks of the microprocessor. This is also applicable to a power supply circuit. So long as the power supply circuit capable of changing the value of the power supply voltage to be supplied to some of circuit blocks is used, it can be considered that the power supply circuit selects a power supply voltage having a different value and supplies it to each of a plurality of circuit blocks of the microprocessor.

As detailed so far, according to the present invention, a microprocessor can be obtained in which a specific circuit block can be operated at high speed while the total consumption power of the microprocessor is suppressed lower than a predetermined maximum consumption power.

What is claimed is:

1. A microprocessor comprising:

a plurality of circuit blocks;

a power supply circuit for selectively supplying one of a plurality of power supply voltages having different values to each circuit block;

a clock supply circuit for selectively supplying one of a plurality of clocks having different frequencies to each circuit block; and a control circuit for instructing said power supply circuit and said clock supply circuit to selectively supply a clock and a power supply voltage to each circuit block, wherein:

a highest speed clock having a highest frequency among the plurality of clocks can be used by a circuit block supplied with a highest power supply voltage among the plurality of power supply voltages;

one of clocks slower than the highest speed clock can be used by a circuit block supplied with one of power supply voltages lower then the highest power supply voltage; and when the highest speed clock and highest power supply voltage are supplied to one of the circuit blocks, said control circuit controls to supply one of clocks slower than the highest speed clock and one of power supply voltages lower than the highest power supply voltage to at least one of other circuit blocks, wherein when said control circuit instructs said clock supply circuit to change a clock supplied to at least one of the plurality of circuit blocks to a faster speed clock, said control circuit instructs said clock supply circuit to change a clock supplied to at least one other circuit block to a slower speed clock, wherein said control circuit comprises a circuit, responsive to a specific instruction provided in a program under execution of the microprocessor for switching between the clocks and power supply voltages and in accordance with information on switching between the clocks and power supply voltages designated by the instruction, for designating at least one circuit block among the plurality of circuit blocks at least one of the clock and power supply voltage of which is to be changed, for generating a change signal representative of a value of at least one of the clock and power supply voltage to be changed, and for supplying the change signal to said clock supply circuit and said power supply circuit, wherein the change signal includes a set of change signals indicating the clock and power supply voltage to be supplied to one of the plurality of circuit blocks, wherein said control circuit comprises a memory for storing a plurality of change signal sets and a circuit for reading the set of change signals from the memory in accordance with the switching information designated by the specific instruction and supplying the set of change signals to said power supply circuit and said clock supply circuit, and wherein the change signal set is the set of change signals indicating the clock and power supply voltage to be supplied to one of the plurality of circuit blocks.

2. A microprocessor comprising:

a plurality of circuit blocks;

a power supply circuit for selectively supplying one of a plurality of power supply voltages having different values to each circuit block;

a clock supply circuit for selectively supplying one of a plurality of clocks having different frequencies to each circuit block; and a control circuit for instructing said power supply circuit and said clock supply circuit to selectively supply a clock and a power supply voltage to each circuit block, wherein:

a highest speed clock having a highest frequency among the plurality of clocks can be used by a circuit block supplied with a highest power supply voltage among the plurality of power supply voltages;

one of clocks slower than the highest speed clock can be used by a circuit block supplied with one of power supply voltages lower then the highest power supply voltage; and when the highest speed clock and highest power supply voltage are supplied to one of the circuit blocks, said control circuit controls to supply one of clocks slower than the highest speed clock and one of power supply voltages lower than the highest power supply voltage to at least one of other circuit blocks, wherein when said control circuit instructs said clock supply circuit to change a clock supplied to at least one of the plurality of circuit blocks to a faster speed clock, said control circuit instructs said clock supply circuit to change a clock supplied to at least one other circuit block to a slower speed clock, wherein said control circuit comprises a circuit, responsive to a specific instruction provided in a program under execution of the microprocessor for switching between the clocks and power supply voltages and in accordance with information on switching between the clocks and power supply voltages designated by the instruction, for designating at least one circuit block among the plurality of circuit blocks at least one of the clock and power supply voltage of which is to be changed, for generating a change signal representative of a value of at least one of the clock and power supply voltage to be changed, and for supplying the change signal to said clock supply circuit and said power supply circuit, wherein the change signal includes a set of change signals indicating the clock and power supply voltage to be supplied to one of the plurality of circuit blocks, wherein said control circuit comprises a memory for storing a plurality of change signal sets and a circuit for reading the set of change signals from the memory in accordance with the switching information designated by the specific instruction and supplying the set of change signals to said power supply circuit and said clock supply circuit, wherein the change signal set is the set of change signals indicating the clock and power supply voltage to be supplied to one of the plurality of circuit blocks, and wherein said memory is an electrically erasable memory and said control circuit includes a circuit responsive to the specific rewrite instruction for rewriting the plurality of change signal sets stored in said memory.

* * * * *